US005638984A

United States Patent [19]
Munari

[11] Patent Number: 5,638,984
[45] Date of Patent: Jun. 17, 1997

[54] HANDLE FOR COOKING UTENSILS, WITH A MOVABLE PART FOR RETAINING THE LID

[75] Inventor: Francesco Munari, Cardano Al Campo, Italy

[73] Assignee: La Termoplastic F.B.M. S.r.L., Arsago Seprio, Italy

[21] Appl. No.: 701,103

[22] Filed: Aug. 21, 1996

[30] Foreign Application Priority Data

Sep. 8, 1995 [IT] Italy .................. MI95A1892

[51] Int. Cl.[6] .................................................... B65D 25/04
[52] U.S. Cl. ................................... 220/750; 220/318
[58] Field of Search ........................... 220/756, 343, 220/335, 318

[56] References Cited

U.S. PATENT DOCUMENTS

| 1,384,851 | 7/1921 | Richardson | 220/756 |
| 1,666,012 | 4/1928 | Humphrey | 220/756 |
| 2,403,191 | 7/1946 | Phillips | 220/756 |
| 3,518,731 | 7/1970 | Ostrowsky et al. | 24/248 |
| 3,876,104 | 4/1975 | Minsky et al. | 220/318 |
| 4,872,445 | 10/1989 | Kobayashi et al. | 220/756 |
| 5,301,829 | 4/1994 | Chrisco | 220/756 |
| 5,431,298 | 7/1995 | Ahn et al. | 220/756 |

FOREIGN PATENT DOCUMENTS

| 477670 | 11/1947 | Belgium . | |
| 835341 | 3/1952 | German Dem. Rep. . | |
| 835341 | 5/1952 | Germany | 220/756 |
| 205694 | 10/1923 | United Kingdom . | |

Primary Examiner—Joseph M. Moy
Attorney, Agent, or Firm—Steinberg, Raskin & Davidson, P.C.

[57] ABSTRACT

A handle for a cooking utensil (1) with a lid (2), of the type including a fixed part (6) rigidly fixed to the lateral wall (17) of the utensil. To the fixed part (6) there is connected a part (8) movable between at least a closed position (C) in which a first portion (8D) of said movable part (8) is in contact with the lid (2) and a second portion (8B) of said movable part (8) is in contact with a first portion (6B) of the fixed part (6) such that on gripping the handle the lid remains fixed to the utensil, and an open position (A) in which the first portion does not interfere with the lid. The lid comprises a plurality of holes in at least one (P) of its parts.

17 Claims, 1 Drawing Sheet

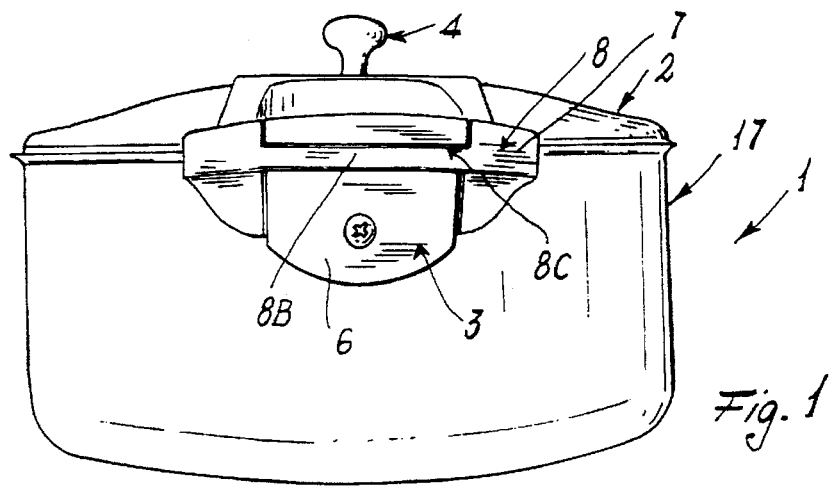
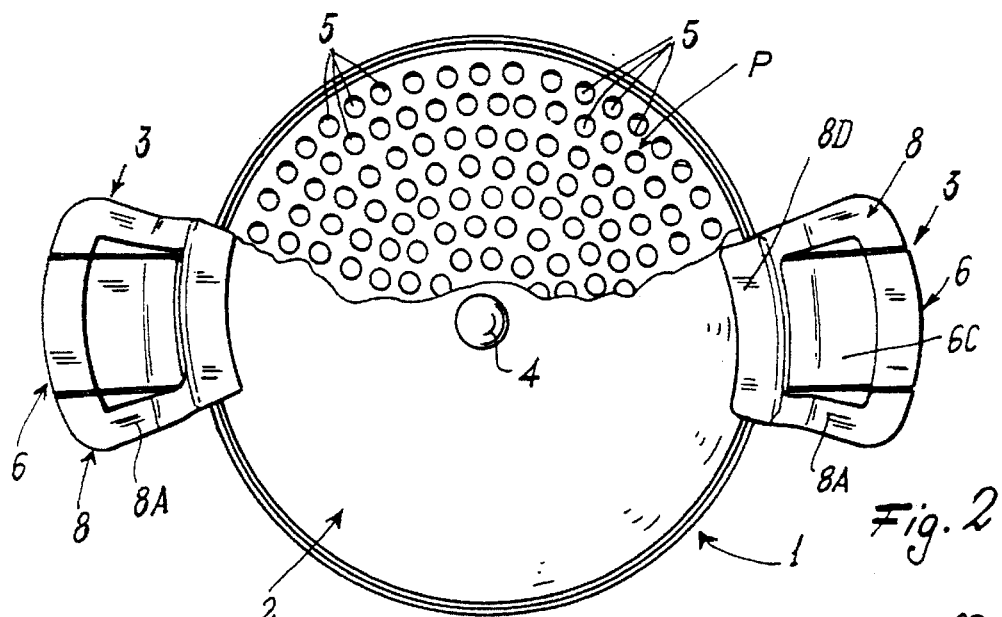
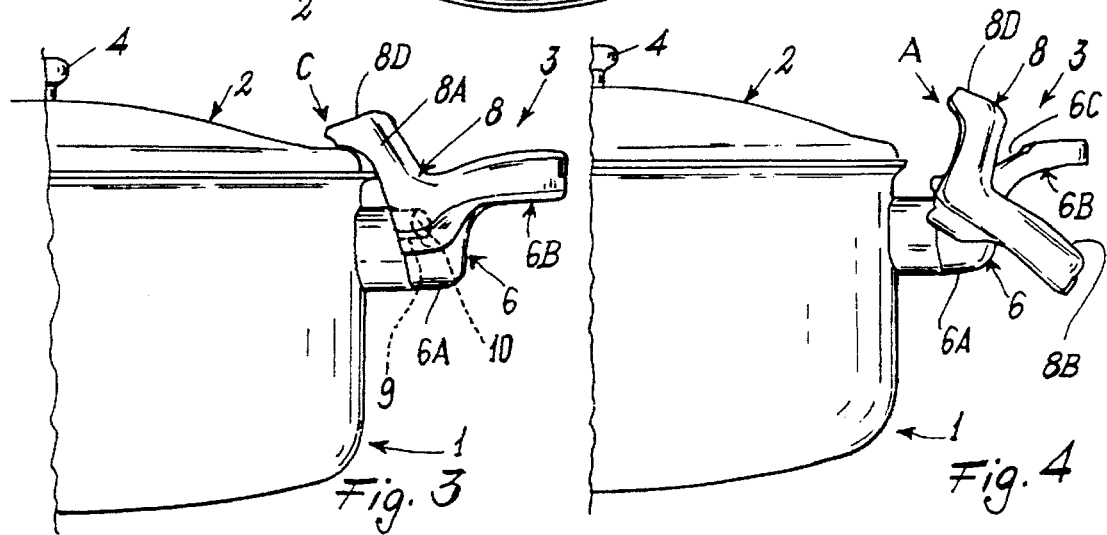

HANDLE FOR COOKING UTENSILS, WITH A MOVABLE PART FOR RETAINING THE LID

FIELD OF THE INVENTION

This invention relates to a handle for a cooking utensil and the utensil itself, of the type comprising a first fixed handle part rigidly fixed to a wall of the utensil, and movable second handle part hinged to the first handle part and arranged to press with a first portion thereof, when in a closed position, against the lid.

BACKGROUND OF THE INVENTION

Traditional handles only enable the utensil to be raised vertically. If the utensil is to be inverted, the lid has to be held with one hand against the utensil, using the other hand to raise and turn the utensil.

This is a very difficult operation and is practically impossible to perform if the utensil is of large size or weight.

Moreover known handles are generally of limited extension and in particular do not extend in correspondence with the free edge of the utensil, this often leading to annoying burns.

Known handles generally do not interfere in any manner with the cooking utensil lid, which may therefore be positioned incorrectly on the utensil, causing the cooked food to splash or escape.

Furthermore if the food is to be strained after cooking, a colander has generally to be used, this not always being to hand and in any event being relatively bulky.

OBJECTS AND SUMMARY OF THE INVENTION

An object of the present invention is to provide a handle for a cooking utensil comprising a lid, which enables the utensil to be raised and inverted without having to hold the lid on with one hand.

A further object is to provide a handle which gives greater protection to the user's fingers, while at the same time always ensuring correct positioning of the lid on the utensil.

A further object is to provide a handle which can be applied to usual utensils without their requiring particular modification, which is of simple construction, is of low cost and is of pleasant appearance.

A further object is to provide a cooking utensil which facilitates and simplifies the operations involved in straining the food and which, in particular, no longer requires a colander to be used.

These and further objects which will be apparent to an expert of the art are attained by a handle and utensil wherein the handle has a movable part which comprises two arms arranged to connect a first portion thereof, which is pressed against the lid in such a manner as to fix it securely to the utensil to the extent of being able to invert the utensil, to a second portion thereof. The arms and the second portion of the movable part are shaped such that, when the movable part is in a lid-closing position, the second portion of the movable part abuts against a surface of a portion of a first fixed part of the handle which faces toward the base of the utensil. The arms, the second portion of the movable part and the portion of the first part which faces the base of the utensil blend substantially together to form a single gripping body or member, such that upon gripping the gripping body, a pressing action of the first portion of the movable part against the lid is obtained.

BRIEF DESCRIPTION OF THE DRAWINGS

The present invention will be more apparent from the accompanying drawings, which are provided by way of non-limiting example and in which:

FIG. 1 is a schematic side view of a cooking utensil to which two handles according to the invention are applied;

FIG. 2 is a schematic view thereof from above;

FIGS. 3 and 4 are two schematic side views thereof with the handle in two different working positions.

DESCRIPTION OF THE PREFERRED EMBODIMENTS

The figures show a cooking utensil 1, namely a saucepan in the example, comprising a lid 2 and two handles 3. The utensil 1 is of traditional type and will therefore not be described in detail. The lid 2 has the usual dished shape and comprises a knob 4. The lid can also comprise in a part P of its surface a plurality of through holes 5 to enable it to also be used as a colander, as explained hereinafter.

The handles 3 each comprise a fixed part 6 rigidly fixed to the utensil side wall 17 in a manner conventional to the expert of the art, and a movable part 8 hinged to the fixed part 6. The fixed part 6 comprises a first portion 6A to be fixed to the utensil, and an arched second portion 6B extending from the first. The upper side of the arched portion comprises a step 6C (FIG. 4). Laterally, the portion 6A comprises two grooves 9 for hinging the movable part 8. The movable part 8 has a closed substantially isosceles trapezoidal shape with the two bases 8B and 8D slightly arched and positioned at two different levels. These are connected together by lateral arms 8A which, in the illustrated example, form substantially a V shape, and comprise at the vertex of this V, on that face facing the fixed part 6, stems 10 arranged to penetrate into the grooves 9 in the fixed part 6, so as to hinge the movable part to the fixed part 6. It should be noted that the movable part 8 could instead be hinged to the fixed part 6 in other usual ways, for example by a pin passing through a hole provided in both the part 6 and the part 8.

The two lateral arms 8A of the movable part 8 of the handle connect together a first base portion 8D arranged to adhere to the edge of the lid, and a second base portion 8B which, when the portion 8D rests on the lid, abuts against that surface of the arched portion 6B of the fixed part of the handle which faces the bottom of the utensil.

The part 8 is movable between a closed first position C (FIG. 3) in which its first base portion 8D rests against the edge of the lid and its second portion 8B abuts against the portion 6B of the handle fixed part 6, and an open position A (FIG. 4) in which the first portion 8D does not interfere with the lid and the second portion 8B does not interfere with the fixed part.

When in the closed position C the two parts 6, 8 of the handle form a single body, and the utensil can be not only raised but also inverted. In this respect, the lid 2 remains fixed to the utensil by the action of the movable part 8 of the handle.

In this manner, if using a perforated lid the contents of the utensil can be very easily strained.

When in the open position A the two parts 6 and 8 of the handle form two distinct bodies, only the part 6 being used to raise the saucepan.

It should be noted that when the movable part 8 is in the closed position and the handle is not gripped by the user, the pressure exerted on the lid by said movable part 8 is substantially zero, such as to prevent dangerous pressures being generated within the utensil.

It should further be noted that by virtue of the movable part 8 of the handle and in particular of its minor base 8D, which is of greater width than the opposing portion of the fixed part 6, the user's fingers are more protected than in the case of known handles.

Advantageously, as shown on the accompanying drawings, when the handle is in its closed position the movable part 8 and fixed part 6 form a single body with the edges of the two parts being flush with each other, this both optimizing the gripping effect of the handle and minimizing dirt accumulation on the handle.

Finally, it should be noted that the aforedescribed embodiment is provided by way of example only, and that numerous modifications are possible, all falling within the same inventive concept. For example the form and/or type of connection of the two constituent parts 6, 8 of the handle could be different from that described, and the arrangement of the holes 5 in the lid could be different from that indicated.

I claim:

1. A handle for a cooking utensil (1) with a lid (2), of the type comprising a fixed first part (6) rigidly fixed to a wall of the utensil, and a movable second part (8) hinged to said first part and arranged when in a closed position (FIG. 3) to press with its first portion (8D) against the lid (2) in such a manner as to fix it securely to the utensil to the extent of being able to invert this latter, characterised in that said movable part (8) comprises two arms (8A) arranged to connect said first portion (8D) to a second portion (8B); said arms (8A) and said second portion (8B) being shaped such that, when in said closed position, said second portion (8B) abuts against that surface of a portion (6B) of said fixed part (6) which faces the base of the utensil; said arms (8A), said second portion (8B) and said portion (6B), when in said closed position, blending substantially together to form a single body, and only by gripping said body is said pressing action of the first portion (8D) on the lid achieved.

2. A handle as claimed in claim 1, characterised in that the two arms (8A) form substantially a V-shape, the movable part (8) being hinged to the fixed part (6) in correspondence with the vertex of said V.

3. A handle as claimed in claim 1, characterised in that when in the closed position (C), the first portion (8D) of the movable part extends along the edge of the lid and has a width greater than that of the opposing portion of the fixed part (6).

4. A handle as claimed in claim 1, characterised in that the two portions (8B, 8D) and the two arms (8A) of the movable part (8) define an aperture within which said fixed part (6) is provided.

5. A handle as claimed in claim 1, characterised in that the fixed part (6) laterally comprises grooves (9) arranged to house pins (10) extending from the opposing surfaces of the two arms (8A) of the movable part (8).

6. A cooking utensil (1) of the type comprising a lid (2) and, on its lateral wall (17), two handles as claimed in claim 1.

7. A utensil as claimed in claim 6, characterised in that the lid comprises, at least in a part (P) thereof, a plurality of through holes (5) so that it can be used to strain the utensil contents.

8. A cooking utensil including at least one handle and a lid, said at least one handle comprising
a first handle part fixedly attached to a wall of the utensil, and
a second handle part hingedly mounted to said first handle part and movable between a first position in which said second handle part engages and presses the lid against a cooperating surface of the utensil to enable the utensil to be inverted while maintaining the lid in engagement with the utensil and a second position in which said second handle part is not in engagement with the lid,
said second handle part comprising a first base portion directly engaging with the lid when said second handle part is in said first position, a second base portion directly engaging with a portion of said first handle part facing a bottom of the utensil when said second handle part is in said first position, and first and second arms for connecting said first base portion to said second base portion, a portion of said first and second arms, said second base portion and said portion of said first handle part facing the bottom of the utensil cooperating when said second handle part is in said first position to provide a gripping member such that upon gripping of said gripping member, the lid is securely pressed against the cooperating surface of the utensil.

9. The utensil of claim 8, wherein said first and second arms are arranged to form a V-shaped portion of said second handle part, said second handle part being hinged to said first handle part at a vertex of the V-shaped portion.

10. The utensil of claim 8, wherein said first base portion of said second handle part extends along an edge of the lid and has a width greater than a width of an opposing portion of said first handle part when said second handle part is in said first position.

11. The utensil of claim 8, wherein said first base portion, said second base portion and said first and second arms are arranged to define an aperture therebetween, said first handle part being situated at least in part in said aperture.

12. The utensil of claim 8, wherein said first handle part comprises at least one groove, said second handle part comprises at least one pin cooperating with and movable within a respective one of said at least one groove in said first handle part to thereby hinge said second handle part to said first handle part.

13. The utensil of claim 12, wherein said at least one groove comprises two grooves and said at least one pin comprises two pins extending inwardly from said first and second arms toward each other and into a respective one of said two grooves.

14. The utensil of claim 8, wherein said first and second arms connect first and second discrete locations of said first base portion to respective first and second discrete locations of said second base portion such that a space is defined between said first and second arms.

15. The utensil of claim 8, wherein said first handle part has a first portion fixed to the wall of the utensil and a second portion arched upwardly and outwardly away from the utensil from said first portion, said portion of said first handle part facing the bottom of the utensil being arranged on said second arched portion.

16. A cooking utensil, comprising
a substantially circular bottom member,
a side wall extending upward from a periphery of said bottom member such that an opening is formed in opposed relationship to said bottom member,
a lid for covering the opening, and
first and second handles arranged on an exterior surface of said side wall in diametrically opposed relationship to one another, each of said handles comprising a first handle part fixedly attached to said side wall, and a second handle part hingedly mounted to said first handle part and movable between a first position in which said second handle part engages and presses said lid against said side wall and a second position in which said second handle part is not in engagement with said lid, said second handle part comprising a first base portion directly engaging with said lid when said second handle part is in said first position, a second base portion directly engaging with a portion of said first handle part facing toward said bottom member when said second handle part is in said first position, and first and second arms for connecting said first base portion to said second base portion, a portion of said first and second arms, said second base portion and said portion of said first handle part facing toward said bottom member cooperating when said second handle part is in said first position to provide a unitary gripping member such that upon gripping of said gripping member, said lid is securely pressed against said side wall.

17. The utensil of claim 16, wherein said lid comprises a plurality of through holes in at least a part of said lid.

* * * * *